United States Patent [19]

Warinner

[11] 4,365,938
[45] Dec. 28, 1982

[54] MODULAR LOW HEAD HIGH VOLUME WATER PUMP AND AQUACULTURE SYSTEM

[76] Inventor: Archie F. Warinner, P.O. Box 68, Sorrento, La. 70778

[21] Appl. No.: 111,721

[22] Filed: Jan. 14, 1980

[51] Int. Cl.³ .............................................. F04B 21/00
[52] U.S. Cl. .......................................... 417/54; 415/7; 417/61; 417/78; 417/89; 417/174
[58] Field of Search .................... 417/61, 174, 78, 84, 417/89, 54; 415/7; 261/120; 210/242.1

[56] References Cited

U.S. PATENT DOCUMENTS

| Re. 27,853 | 12/1973 | Frohwerk | 417/61 |
| 250,073 | 11/1881 | Hudson | 417/174 X |
| 1,143,118 | 6/1915 | Hoffman | 415/7 |
| 2,306,727 | 12/1942 | Hill | 417/174 X |
| 3,189,334 | 6/1965 | Bell | 261/120 X |
| 3,206,380 | 9/1965 | Daviau | 417/174 X |
| 3,756,578 | 9/1973 | McGurk | 261/120 X |
| 3,794,303 | 2/1974 | Hirshon | 26/120 X |
| 3,846,516 | 11/1974 | Carlson | 261/120 X |
| 3,851,996 | 12/1974 | Winther | 417/61 |
| 4,086,306 | 4/1978 | Yoshinaga | 261/120 X |

Primary Examiner—Carlton R. Croyle
Assistant Examiner—Edward Look
Attorney, Agent, or Firm—James M. Pelton

[57] ABSTRACT

A water pump system having a float and underwater intake with discharge into an increasingly sized series of consecutive pipes, open to the water body, for entraining additional water with that expelled from the discharge to provide a high volume, low rate and pressure water mover and a method of aquaculture employing the system.

2 Claims, 3 Drawing Figures

MODULAR LOW HEAD HIGH VOLUME WATER PUMP AND AQUACULTURE SYSTEM

BACKGROUND OF THE INVENTION

The present invention relates to a water pump system in which low power and low flow rates are used to move large volumes of water. More particularly, the modular water pump system of my invention allows a low power motor to move large volumes of water at low water head and low flow rates. In addition, the water pump system of my invention is useful in a closed water body for a circulation system in aquaculture.

THE PRIOR ART

Heretofore, modular floating water cooling systems have used floating water pumps and spray nozzles to force water to several floating spray heads for circulating and spraying water into the air for cooling by evaporation and aeration. Such systems are useful in closed loop and once through downstream cooling water systems, see U.S. Pat. No. Re. 27,852 to Frohwerk. In another low lift pump system, an outboard motor attached to a frame forces water through a venturi tube, transpiring a weir structure, U.S. Pat. No. 3,851,996. However, these systems are not designed to move large volumes of water at very economical cost. Accordingly, a low lift, low rate, high volume water pump system which consumes low power is still desirable.

THE INVENTION

Accordingly, the above advantages and features are provided by the water pump means of my invention. Preferably, in my invention, a water pump is attached to a supporting float and has a water inlet communicating with a water body and has a suitable water discharge which directs the flow of water through a series of pipes of increasing size. These pipes also have their inlet ends opened to the water and their outlet ends within the next pipe so that water forced through the pump and into the first discharge brings additional water from the outside of the first pipe, thus increasing the flow volume and while at the same time decreasing the flow rate. This process repeats itself at each larger pipe until finally a rather high volume of water is being moved at a low flow rate by a relatively low powered source. Without limiting my method to any particular mode of operation or working mechanism, it is believed that the eductor principle is employed, such that a low pressure area is created at the inlet of each pipe and the kinetic energy of the water entering is used to move additional volumes of water so that as each pipe increases in size, the volume of water moved increases while the flow rate decreases.

In a preferred aspect of the apparatus of my invention, there is provided a modular floating water pump system for using a low power motor to move large amounts of water at low pressures and rates in a contained water body comprising an anchored float means supporting water pump means having water intake means in communication with said water body, and outlet means communicating with a series of submerged concentrically disposed conduits in end to end relation, each succeeding conduit having its outlet end interposed in the inlet end of the next larger conduit, the inlet of which is also open to said water body so that water flow through one conduit causes reduced pressure at the inlet of the next larger conduit thereby causing water in the body outside of the next larger conduit to flow into it whereby the amount of water flowing through a particular conduit is increased in direct proportion to the ratio of the increase in the cross-sectional area of the respective successive conduits and the rate of flow is inversely proportional to said ratio.

DETAILED DESCRIPTION OF PREFERRED EMBODIMENTS

Figure 1:
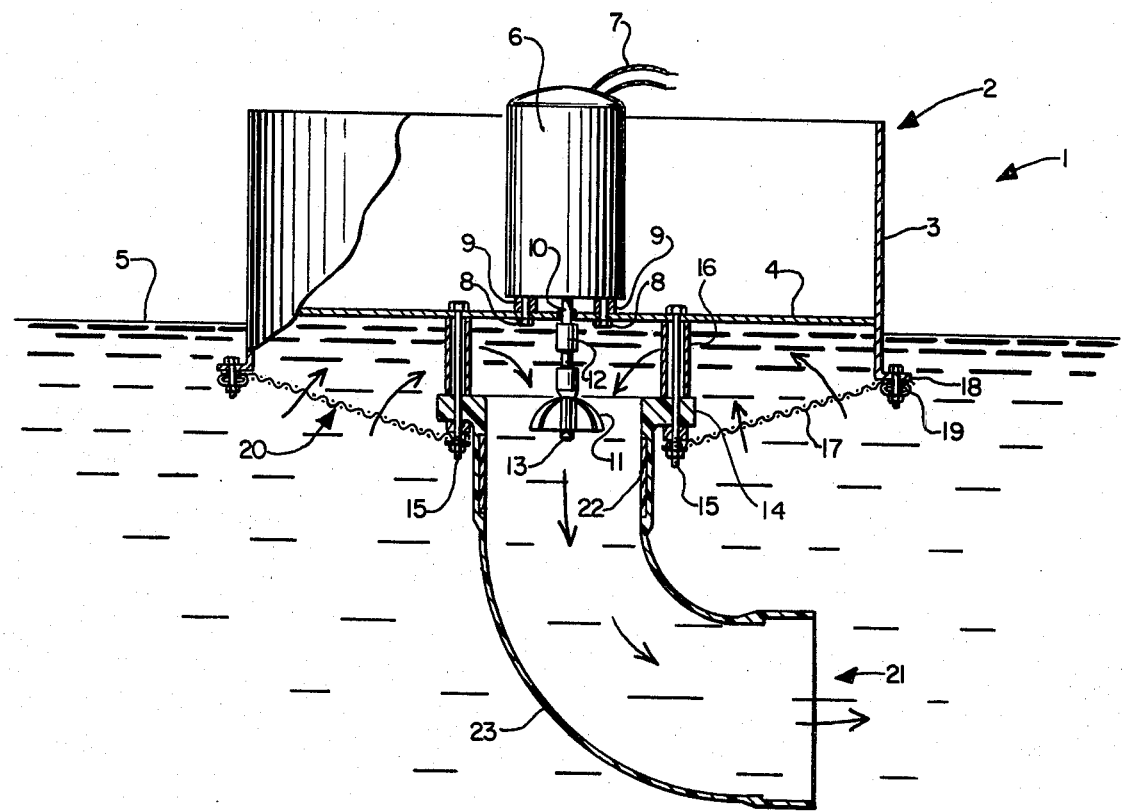
FIG. 1 is a partial cross-sectional view of the floating water housing and power means for operating the water pump of my invention.

The apparatus of my invention can be more easily illustrated with my specific reference to FIG. 1, in which the water pump system, indicated generally by 1, has a float means 2 with side walls 3 and a floor 4 in any particular configuration which describes a container capable of floating on water. The side walls can be rectangular or square and have a corresponding floor or have any desired shape so long as a container is formed which floats. Preferably, and as illustrated in FIG. 1, the side walls 3 forms a cylindrical tube having a circular floor 4 attached thereto by any convenient means, such as, for example welding, brazing, epoxy gluing or any other conventional method sufficient to form a water resistant or water tight fit and permit the housing 2 to float on the surface of a water body, generally indicated by the designation 5. The housing 3 contains a drive means for the water pump system 1, which can be any conveniently available motive power source. For purposes of illustration only, there is shown electric motor means 6 connected to a source of electric power by one or more waterproof electric lines 7 (shown by representation only and not as actually found on most electric motors). Electric motor means 6 is attached to floor 4 in watertight fashion by means of motor mounting bolts 8 and is cushioned and spaced from floor 4 by motor spacers 9 on each of bolts 8. Attached to electric motor means 6 is a working shaft 10 which transpierces floor 4 and can be rotatably sealed by conventional watertight seals (not shown in my invention for the sake of clarity and brevity). Working shaft 10 is fixedly attached to a suitable propeller 11, for example by means of an arbor 12 and propeller shaft 13 attached by a series of washers, lock washers, nuts and lock nuts, all of conventional and known means to fixedly attach propellers to shafts. Alternatively, other propeller attachment means can be employed and such is not critical to the water pump system 1 of my invention.

Propeller 11 lies within the throat of flange 14 which is fixed in spaced relation from the propeller 11 and float means 2 by flange anchor bolts 15 and flange spacer tubes 16. Flange anchor bolts 15 are held in place by washers and nuts or any convenient fastening means. Thus, flange 14 is spaced from float means 2 and open to water body 5 such that turning propeller 11 by activating electric motor means 6 forces water through the throat of flange 14 and the lower water pressure surrounding the propeller 11 above pulls water into and through the flange 14.

To prevent fouling the water pump system 1, a screen 17 is provided from the lower edge of side walls 3 to flange 14. As shown in FIG. 1, screen 17 is attached, for example, by washer and nut assembly, to flange anchor bolts 15 at one edge of screen 17 and to side wall flange 18 by means of nut, washer, bolt and flexible flange ring 19. Screen 17 can have mesh of a size large enough to permit practically free passage of water, but small enough to exclude material, debris, flotsam and jetsam large enough to damage the propeller 11 or piping or which would tend to cause clogging of the throat of flange 14 or fouling of propeller 11. Thus, it may be necessary to periodically clean or scrape screen 17 to prevent its fouling and cut off water intake.

From a cursory inspection of FIG. 1, it can be seen that the flange 14, screen 17 and lower portion of float means 2 form a water intake means 20 in communication with water body 5 and into which water is forced by propeller 11. From the throat of flange 14, water flows through water discharge means 21. As shown in FIG. 1, water discharge means 21 is formed of internal union 22 and a 90° elbow discharge conduit 23. It should, of course, be apparent that water discharge means 21 can end in any particular conduit desired so long as it is comensurate in size with flange 14 or attached thereto by appropriate reducing or expanding sections of conduit 23. Further, it should likewise be apparent that conduit 23 could also be a straight downwardly projecting pipe as well as one having an angular bend of greater than or less than 90°. Other sizes, shapes and configurations of water discharge means 21, such as a double or other multiple opening discharge conduit are within the scope of my invention. It is only necessary that there be some spaced relation between water intake means 20 and water discharge means 21 so that immediate recirculation does not occur.

Figure 2:
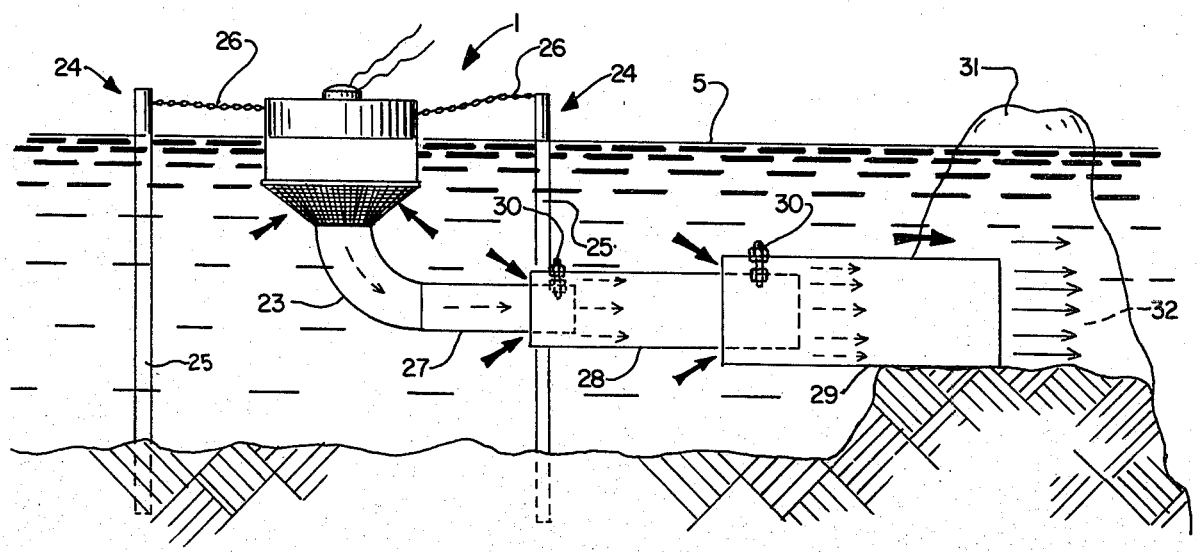
FIG. 2 is a schematic representation of the use of the water pump system of my invention showing water movement through the successively increasing pipes.

According to my invention, the water pump system described herein can be used to move large volumes of water at low pressures and low flow rates. As shown in FIG. 2, the water pump system 1 is placed in a water body 5 and anchored in position by one or more anchor means 24, for example, a post 25 driven into the bottom of the water body and attached by line or chain 26 to the side wall 3 of water pump system 1. Other anchor means such as multiple lines to the banks of the water body, boat anchors or heavy weights could alternatively be used to place and maintain water pump system 1 in position.

An extension conduit 27 is attached at one end to the discharge conduit 23 and carries the water pumped by water pump system 1. The other end or discharge end of extension conduit 27 is placed in the intake of a first expansion conduit 28. The intake of first expansion conduit 28 being larger than extension conduit 27 is also open to water body 5 and is full of water initially prior to actuating water pump system 1. For best efficiency, first expansion conduit 28 is spaced equidistant about the discharge end of extension conduit 27. The flow of water from extension conduit 27 into first expansion conduit 28 causes the water initially present to move along with it toward the discharge end of first expansion conduit 28. This reduces pressure at the intake end and water from water body 5 flows into the intake of first expansion conduit 28. The increased size of first expansion conduit 28 and the work expended in moving additional quantities of water by the water discharged from extension conduit 27 causes the flow rate to decrease. However, the volume of water being moved is increased. This increase in the quantity of water moved can be multiplied by use of additional expansion conduits. This is illustrated in FIG. 2 in which the discharge end of first expansion conduit 28 is placed in the intake of second expansion conduit 29 which is likewise larger in cross-section than first expansion conduit 28 and equidistantly spaced therein. Water flow exiting first expansion conduit 28 causes increased water volume flow through second expansion conduit 29 at decreased flow rates.

Any particular means for maintaining the spacing between successively sized conduits can be used. As shown in FIG. 2, retainer bolt assembly 30 is placed through a hole near the inlet end of one conduit in register over a hole in the discharge end of the conduit within and fastened by appropriate washers and nuts. Although it has been found that one bolt is sufficient to maintain spacing, several retainer bolt assemblys 30 could be employed disposed about the circumference of the conduits to insure stability and still not unduly interfere with water flow. Other spacing and bracing means will be readily apparent to the skilled mechanic.

As shown in FIG. 2, the discharge end of second expansion conduit 29 is placed in an opening 32 in a central divider 31 of water body 5 and the opening 32 acts as an additional expansion conduit carrying further increased volumes of water to a second portion of water body 5. At this point, the volume of water being moved has greatly increased whereas the flow rate is greatly decreased. The low flow through the levee allows fish and aquatic animals to move upstream or against the flow without undue difficulty.

Suitable bracing or supports at the intake and discharge ends of the conduits can be used to insure optimal placement of the discharge ends of one conduit within the intake of another. Further, suitable anchoring means or support means can be employed to maintain the various conduits in fixed relation to each other and the water pump system 1.

As an alternative to the float means 2 as illustrated in FIG. 1, it is also within the scope of my invention to employ a submersible motor and pump unit in which electrical leads from any convenient power source are attached to a submerged submersible motor in connection with the working shaft and propeller. In such cases, the motor is securely anchored in place and the propeller placed in the throat between the water intake and discharge means of the water pump system. Various configurations of these elements of this alternative form of my invention can be readily envisioned by skilled practitioners.

The water pump system of my invention finds excellent opportunities for use in various aquaculture applications. Aquatic plants and animals rarely survive long periods of time in water bodies having little or no circulation. Lack of circulation causes stagnation, deoxygenation, stratification and toxification of the water. Eventually, lack of circulation of the water will preclude living organisms including microorganisms, plants, animals, fish, etc. One of the main disadvantages to culturing fish, oysters, crawfish and the like has been the expense involved in maintaining a sufficient population density of the species in a closed pond. However, I have found that circulation of the water allows increased species population and higher population density. The high cost of water circulation in a closed pond can be substantially decreased by use of the water pump system of my invention.

Figure 3:
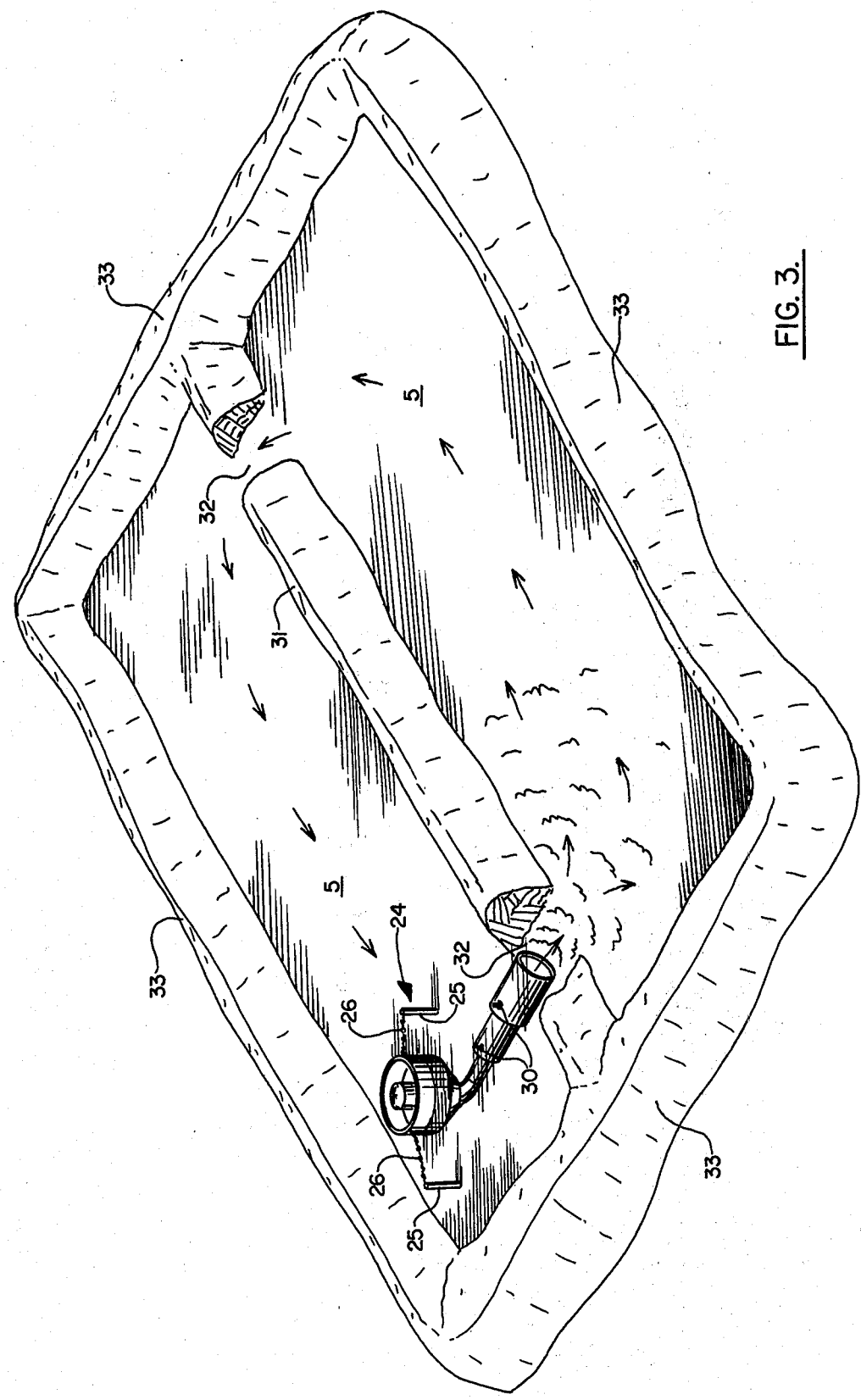
FIG. 3 is a pictorial representation of one application of the water pump system of my invention in an aquaculture system for circulating water in a closed water body.

As shown in FIG. 3, the water pump system 1 of my invention can be employed in a method for culturing aquatic life in a contained water body 5 which includes establishing a contained body of water having a central divider 31 with openings 32 at each end of the central divider 31 for passage of water and aquatic life species contained within water body 5. A low head, low flow rate, high volume modular floating water pump system 1, as described hereinabove, is placed in one of the openings 32, actuated and circulates the water in water body 5 by means of the water pump system of my invention whereby the aquatic life to be cultured can exist in the moving body of water, as contained, preventing stagnation thereof and additionally circulating existing or added food materials and oxygen within the water. Preferably, the contained water body 5 is established by means of a series of dikes or levees 33, or other earthworks. However, manufactured tanks, ponds, concrete, metal or plastic-lined depressions in the earth or aboveground structures can also be used with the aquaculture method hereindescribed.

Having disclosed my invention, it is evident that skilled practictioners will readily envision modifications and alternatives thereof which are within the scope and spirit thereof. Accordingly, it is desired that the invention be limited only by the lawful scope of the following claims.

What is claimed is:

1. A method for culturing aquatic life in a contained body of water open to the atmosphere, said method comprising the steps of establishing a contained body of water having a central divider with openings at each end of said central divider for passage of water and aquatic life species, placing a low head, low flow-rate high volume modular floating water pump system in one of said openings, said modular floating water pump system comprising an anchored float means supporting water pump means having water intake means in communication with said water body, and outlet means communicating with a series of submerged concentrically disposed conduits in end to end relation, each succeeding conduit having its outlet end interposed in the inlet end of the next larger conduit which inlet is open to said water body so that water flow through one conduit causes reduced pressure at said next larger conduit inlet thereby causing water in said body outside of said next larger conduit to flow into said next larger conduit inlet whereby the amount of water flowing through said conduit is increased in direct proportion to the ratio of the increase in the cross-sectional area of the respective successive conduits and the rate of flow is inversely proportional to said ratio, and circulating said water by means of said system whereby said aquatic life can exist in a moving body of water which brings food and oxygen to said aquatic life and prevents water stagnation.

2. The method of claim 1 wherein said contained body of water is a pond established by providing levees and having a central dividing levee with openings at both ends thereof.

* * * * *